US012320677B2

(12) United States Patent
Mirbozorgi

(10) Patent No.: US 12,320,677 B2
(45) Date of Patent: Jun. 3, 2025

(54) MULTI-RESONANCE AND TRANSFER-LEARNING BASED TRACKING SYSTEM

(71) Applicant: THE UAB RESEARCH FOUNDATION, Birmingham, AL (US)

(72) Inventor: Seyedabdollah Mirbozorgi, Birmingham, AL (US)

(73) Assignee: THE UAB RESEARCH FOUNDATION, Birmingham, AL (US)

( * ) Notice: Subject to any disclaimer, the term of this patent is extended or adjusted under 35 U.S.C. 154(b) by 463 days.

(21) Appl. No.: 17/667,958

(22) Filed: Feb. 9, 2022

(65) Prior Publication Data
US 2023/0251108 A1 Aug. 10, 2023

(51) Int. Cl.
*G01D 5/14* (2006.01)
*A01K 1/03* (2006.01)
*A01K 29/00* (2006.01)
*G06N 5/022* (2023.01)
*G06V 10/80* (2022.01)

(52) U.S. Cl.
CPC ............... *G01D 5/14* (2013.01); *A01K 1/031* (2013.01); *A01K 29/005* (2013.01); *G06N 5/022* (2013.01); *G06V 10/803* (2022.01)

(58) Field of Classification Search
CPC ........................................................ G01D 5/14
See application file for complete search history.

(56) References Cited

U.S. PATENT DOCUMENTS

| 9,726,518 B2 * | 8/2017 | Widmer .................. B60L 53/65 |
| 2015/0200562 A1 * | 7/2015 | Kilinc ..................... H02J 50/10 |
| | | 320/108 |
| 2019/0004085 A1 * | 1/2019 | Rufail .................... G01Q 60/22 |

FOREIGN PATENT DOCUMENTS

CN 110554777 A * 12/2019

OTHER PUBLICATIONS

S. Abdollah Mirbozorgi. "Radiotelemetry for Epileptiform Activity in Freely Moving Rats". Book Chapter. 19 pages. 2021.

* cited by examiner

*Primary Examiner* — Walter L Lindsay, Jr.
*Assistant Examiner* — Milton Gonzalez
(74) *Attorney, Agent, or Firm* — Thomas | Horstemeyer, LLP

(57) ABSTRACT

The present disclosure provides tracking systems and methods. One such method comprises generating a continuous wave signal over a frequency range; applying the continuous wave signal to a reading coil element that is electromagnetically coupled to a sensor array, in which the sensor array comprises a plurality of sensing resonators tuned at different resonance frequencies, where an output frequency response of the sensor array varies as a function of a location of a target object or a shape of the target object within a coverage area of the sensor array; acquiring frequency spectrum data showing changes in the output frequency response of the sensor array from the reading coil element; and predicting, by a control unit device using machine learning, a location of the target object within the coverage area or a behavior of the target object based on the acquired frequency spectrum data. Other methods and systems are also provided.

18 Claims, 15 Drawing Sheets

MULTI-RESONANCE AND TRANSFER-LEARNING BASED TRACKING SYSTEM

BACKGROUND

Monitoring small animal (rats and mice) behaviors in their home cages enables researchers to collect data associated with animals' individual and social activities and behaviors. Such studies need to be run for several weeks, months, or the entire animal life, uninterruptedly, to provide an informative set of information to scientists. Conventional small animal behavior recognition methods are based on image capturing and tracking techniques using one or multiple cameras (RGB and depth imaging) and a processing unit. The conventional red-green-blue (RGB) cameras need proper lighting for accurately detecting the animals. Although there are other methods like ultrasound, none of them are accurate and inexpensive enough to be considered for highly scaling the equipment and addressing the required needs. Thus, such approaches cannot be used for monitoring the animal behaviors in large scales of hundreds and thousands of animal cages simultaneously. Accordingly, there is an unmet need to present a largely scalable automatic intelligent device/system to support the requirements of animal facilities for monitoring individual animals in their home cage.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure describes various embodiments of systems, apparatuses, and methods for detecting and tracking movements of a physical body, such as, but not limited to, the movements of a small animal or other physical object, using multi-resonance frequencies bifurcation-based passive wireless sensing and dual-input transfer learning.

In an exemplary tracking and telemetry system and method, a sensor array having a multi-resonance inductive link formed of sensing resonators (e.g. LC tanks) is positioned at a bottom of an area where one or more objects, such as laboratory mice, water object, metal object, etc., are to be monitored. Accordingly, in a non-limiting example, the sensor array may be positioned on a bottom or underneath a bottom of a cage of one or more laboratory mice. The sensing resonators are each tuned to a different resonance frequency. Thus, in various embodiments, each LC tank of the sensing resonator may have different values of constant capacitors to cover a desired frequency range (e.g., 70-180 MHz). A reading coil element that is comprised of a conductive loop is electromagnetically coupled to and is positioned near the sensing resonators. In various embodiments, the sensor array and reading coil can be located at a bottom of a cage of a laboratory animal with less than 4 mm thickness (e.g., 2 mm thickness).

Due to the relatively strong coupling between the sensing resonators and difference in the values of the resonators' capacitors, the reading coil's reflection coefficient (S11) generates multiple resonance frequencies ($f_1$-$f_6$). A body mass of an object as it moves across the sensor array affects the properties of the resonators' environments and leads to nonlinear changes in the capacitances, inductance, and mutual inductance of the sensor resonators by changing permittivity/conductivity and shaping the electromagnetic fields, which all can be determined precisely by measuring the shifts in the resonance frequencies and the changes in the quality of the resonance frequencies detected by the reading coil. Since the generated electromagnetic fields by the resonators and the relationship between the property of the resonator's environment and electrical parameters changes nonlinearly, machine learning such a transfer learning technique can be used to interpret the frequency spectrum for detecting the mass and location of the object.

Figure 1:
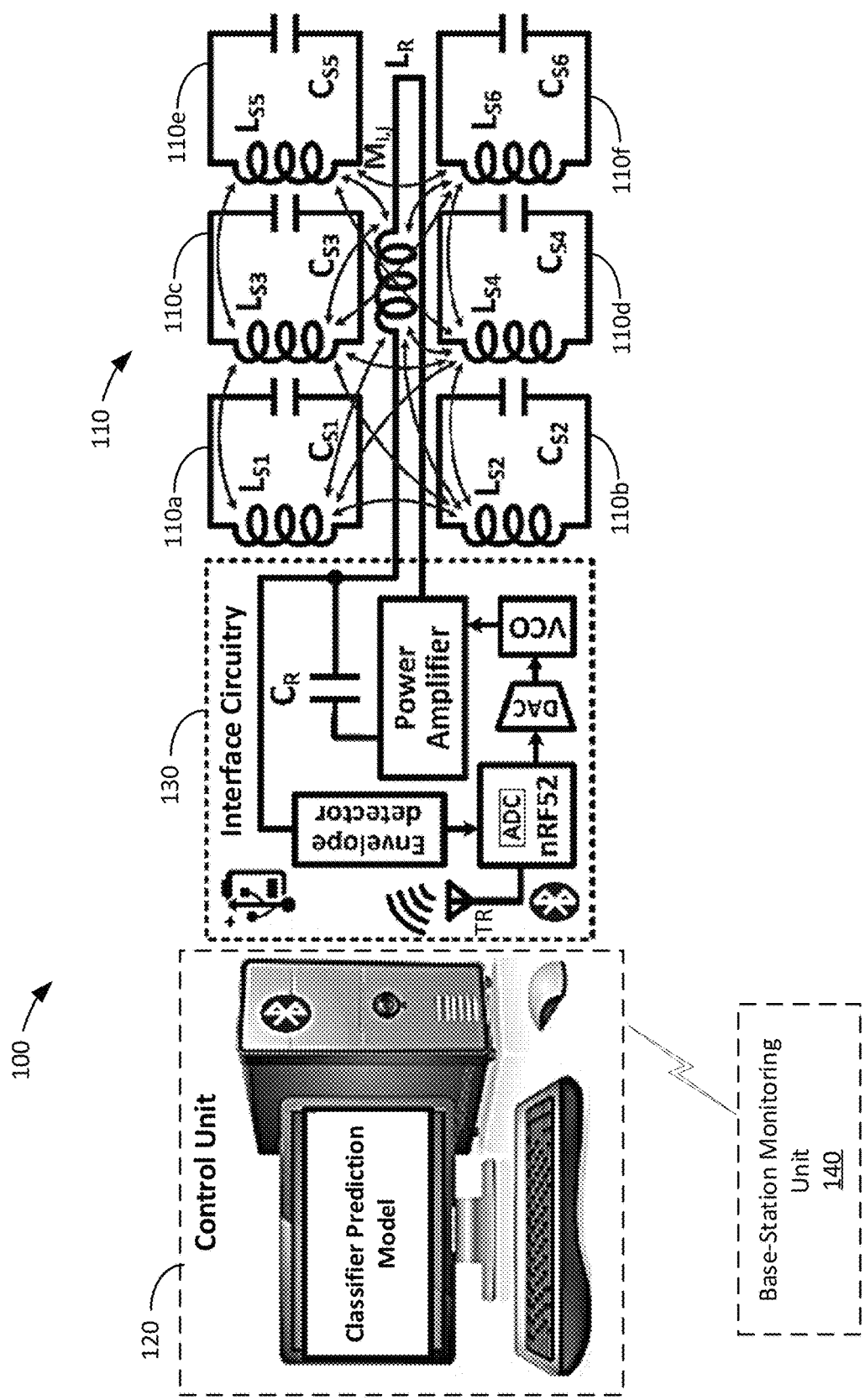
FIG. 1 shows a block diagram for an exemplary tracking and telemetry system of the present disclosure.

Referring now to FIG. 1, a block diagram is provided for an exemplary tracking and telemetry system 100 of the present disclosure. Accordingly, the system includes a sensor array 110 of sensing resonators (LC tanks) 110a-110f tuned at different frequencies (e.g., above 100 MHz). In the non-limiting example of FIG. 1, six resonators are shown; however, the number of resonators in the system is scalable (up/down) based on the size of the target area being covered. The six resonators tilt the sensing area and each resonator generates a unique resonance frequency, $f_1$-$f_6$. Electromagnetically coupled to the sensor array 110 is a reading coil $L_R$ which is coupled to a control unit 120 and interface circuitry 130 (via wired and/or wireless connections). In various embodiments, the control unit 120 includes a microprocessor and a communication transceiver (e.g., Bluetooth Low Energy transceiver, WiFi transceiver, etc.) and the interface circuit 130 includes a signal generator (e.g., digitally variable voltage-controlled oscillator (VCO) whose output can be varied over a range which is controlled by an input DC voltage), power amplifier, digital-to-analog circuitry (DAC), and signal power detector circuit (e.g., self-mixing envelope detector), analog-to-digital circuitry (ADC), etc. The reflection coefficient (S11) of the reading coil $L_R$ provides the frequency spectrum data to the control unit 120 to analyze and interpret the location and posture of an object (e.g., animal body) over the sensor array 110.

To sense the variation of the frequency spectrum through the reading coil's reflection coefficient, S11, the signal generator produces a continuous wave signal (e.g., AC voltage signal) that is applied to the reading coil $L_R$ over a range of frequencies. In one embodiment, an analog signal is generated at an output of the digital-to-analog converter (DAC). Then, the analog signal is applied to the voltage-controlled oscillator (VCO) and produce a sinusoidal signal with a variable frequency range (e.g., from 80 MHz to 180 MHz). To sweep the sinusoidal signal, an analog signal can be applied to the voltage-controlled oscillator (VCO) to produces the sinusoidal signal and the power amplifier amplifies this signal and applies it to the reading coil $L_R$. In an exemplary implementation, considering a center frequency of 130 MHz and resolution of 10,000 points for 100 periods (VCO settling time), the frequency range can be swept as fast as 7.7 ms. Therefore, the information of the entire frequency range may be captured with a sampling rate of 130 samples per second.

The reflection coefficient S11 of the reading coil $L_R$ can be measured by detecting the envelope of the signal using the envelope detector and then digitalized using an analog-to-digital converter (ADC) component. In this way, the reading coil $L_R$ and the interface circuit 130 collect spectrum data. The changes in the location and posture or shape of an object's body can affect the properties of the space enclosing the resonators which leads to changes in the capacitances, inductance, and mutual inductance of the sensor resonators by changing their permittivity/conductivity and shaping the electromagnetic fields. Such changes in the frequency spectrum property can be measured precisely by measuring the shifts and quality changes in the resonance frequencies.

Correctly mapping the posture and location of a target object to the shifts in the resonance frequencies can be a challenge since the density of the electromagnetic fields around the resonators and the property of its enclosed spaces varies nonlinearly by the object body displacement. To address this issue, the frequency spectrum data acquired by the reading coil $L_R$ requires accurate labeling. Therefore, a computing device 210 (FIG. 2) can be used to perform machine learning, such as dual-input transfer learning processes, to train a classifier prediction algorithm to interpret the frequency spectrum for detecting the location, posture, and/or behavior of the target object (e.g., laboratory animal). Accordingly, during a training phase, the computing device 210 acquires video or imaging data of the target object in the coverage area from one or more cameras 220 in addition to the frequency spectrum data (showing changes in the resonances of the sensor array) acquired using the reading coil $L_R$ (FIG. 1). Any shifts or changes in the quality factors of one or multiple resonance frequencies can be interpreted as changes in the animal's location/posture/behavior located just above the sensor array 110 (FIG. 1). Thus, during a training phase, the frequency spectrum data can be labeled, by the transfer learning process, based on the target object's physical location, posture/shape, and/or behavior using the video/imaging data. The computing device 210 using the classifier prediction algorithm can then generate a classifier prediction model to be used in labeling the frequency spectrum data. Accordingly, the classifier prediction model can be transferred to the control unit 120 and used, by the control unit 120, to predict a location, posture/shape, and/or behavior of the target object during an operational prediction phase (after training has been completed).

Figure 2:
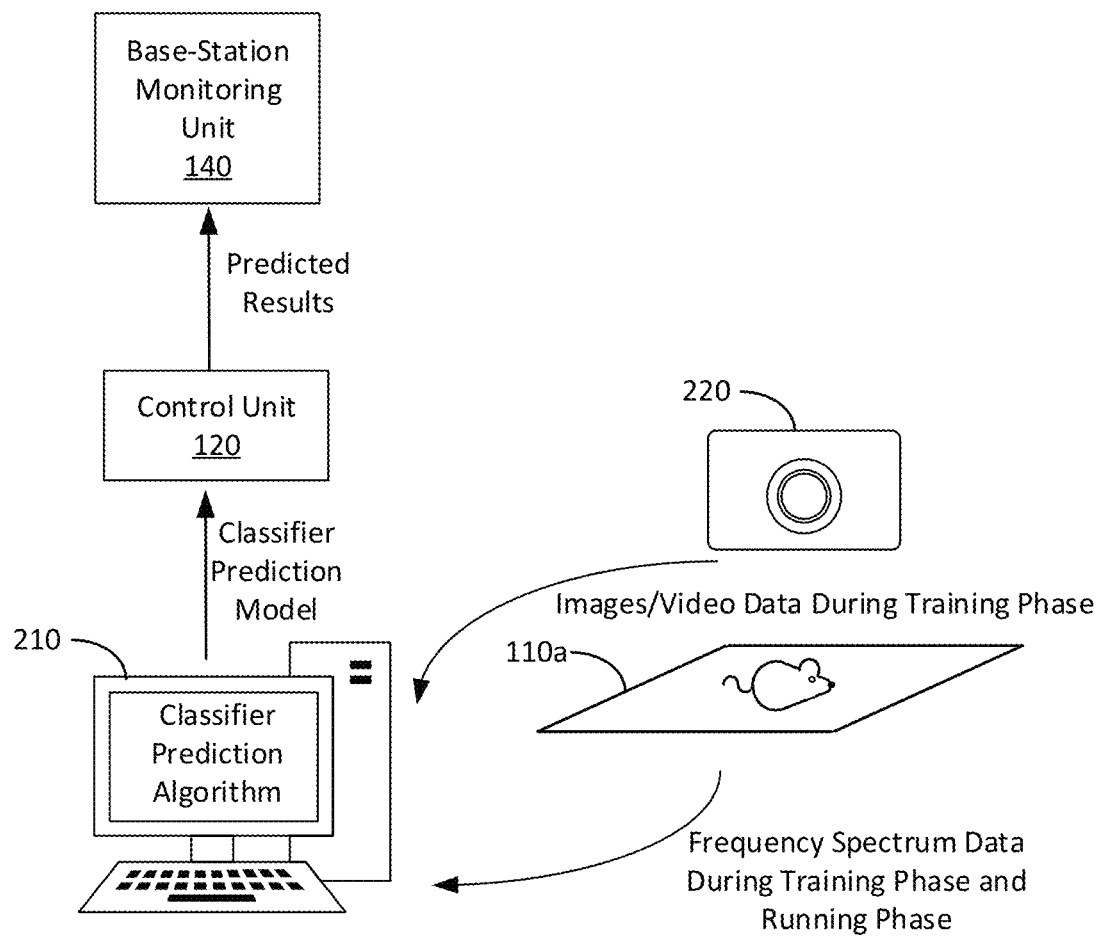
FIG. 2 shows a block diagram of an exemplary system for training a computing device to interpret frequency spectrum data in accordance with various embodiments of the present disclosure.

FIG. 2 provides a block diagram of an exemplary system for interpreting a frequency spectrum signal. The system includes a computing device 210 that executes a classifier prediction algorithm to generate a classifier prediction model during a training phase, such that the classifier prediction model can be transferred to the control unit 120 (e.g., computing/hardware device having a processor) and used during an operational prediction phase by the control unit 120. Accordingly, during the training phase, synchronized imaging or video data from one or more cameras 220 and frequency spectrum data from the reading coil $L_R$ are collected and used to generate the classifier prediction model by the computing device 210. While the one or more cameras 220 are used during the training of the classifier prediction model, the camera(s) 220 are not used during normal operations of the control unit 120 and the classifier prediction model. Accordingly, an exemplary system can rely on the frequency spectrum for detecting the posture, behavior, and/or location of the small animal in a cage or other defined area during the operational prediction phase, as a non-limiting example. During the training phase, the classifier prediction model is trained on one type of data (e.g., imaging/video data from a camera) while re-purposed on a different type of related data (e.g., frequency spectrum from a reading coil).

Therefore, during an operational prediction mode (e.g., regular mode), the reading coil $L_R$ is configured to generate frequency spectrum data that is processed by the classifier prediction model to predict a location, posture/shape, and/or behavior of a target object. In various embodiments, the control unit 120 is configured to transmit the predicted results (and not the raw frequency spectrum data) to a base-station monitoring unit 140 (e.g., via wired or wireless communications, such as Bluetooth, WiFi communications, among others). In various embodiments, the base-station monitoring unit 140 can collect predicted results from multiple control units mounted in one or more racks. In an exemplary implementation, the received data at the base-station monitoring unit 140 can be used for an animal's individual/social behavior recognition to study epilepsy or other neurological disorders.

Figure 3A:
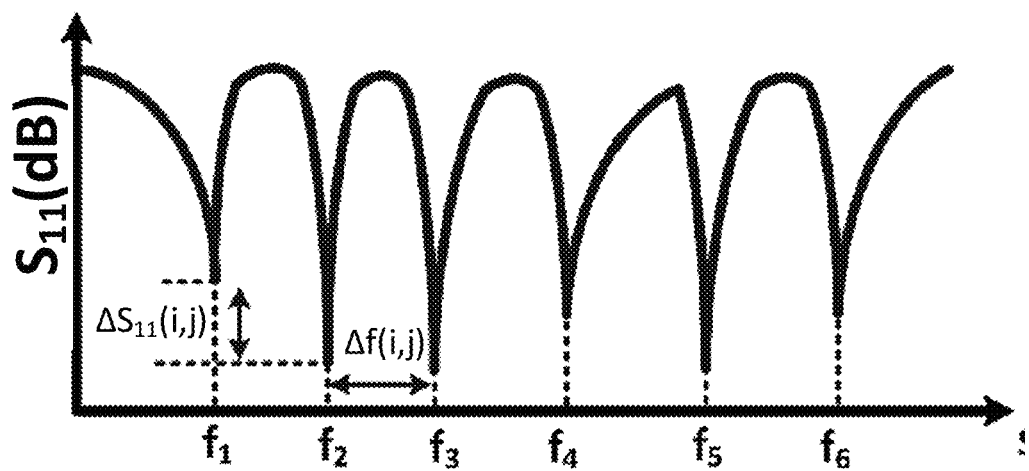
FIGS. 3A-3B respectively show the multiple resonance bifurcations detected by a reading coil which vary in regard to a location and posture of a target object and the sensor array and reading coil assembly in accordance with various embodiments of the present disclosure.
Figure 3B:
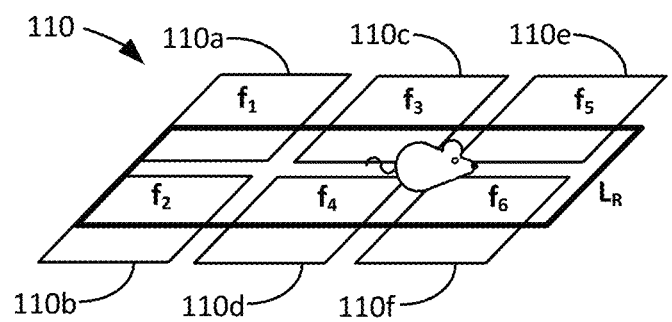

FIG. 3A illustrates the multiple resonance bifurcations that can be detected on the reading coil's reflection coefficient, S11, and generated by the sensor array 110 having six sensing resonators, as shown in FIG. 3B, in which the resonance frequencies $f_1$-$f_6$ vary in regard to the object's physical location and/or posture such that changes in the multiple resonances can be interpreted to monitor the movement and behavior of a target object, such as, but not limited to, a laboratory animal.

As discussed, the control unit 120 can transmit the predicted results to a base-station monitoring unit 140 (e.g., via wired or wireless communications). In various embodiments, the base-station monitoring unit 140 may collect predicted results from multiple control units mounted in one or more racks. Thus, an exemplary tracking and telemetry system may be equipped with a transceiver module (TR in FIG. 1), located underneath a laboratory cage, and can be connected (e.g., a wireless BLE connection) to a transceiver module on a recording unit of the target object (e.g., implanted in or worn by a small animal in the cage) to transmit and receive physiological telemetry data. In this way, the transceiver module can transmit predicted behavior or movements of the target object. Non-limiting examples of such predicted behavior can be related to seizure activities (such as uncontrollable jerking movements of the arms and legs, muscle spasms, etc.) in addition to physiological parameters (such as electroencephalogram (EEG), electrocardiogram (ECG), electromyogram (EMG), blood pressure, and body core temperature, etc.) obtained from a recording unit of the target object. Such information can provide valuable insights into pathophysiological mechanisms and the development of new technologies and treatments for various conditions.

An exemplary tracking and telemetry system/method of the present disclosure facilitates trajectory, caring, behavior studying, and activity and vital signs monitoring of small animals such as rats and mice in animal facilities on a large scale. Thus, it provides researchers a cost-effective experimental tool to study and explore novel solutions and treatment methods for neurological disorders such as epilepsy and seizure, addiction, Parkinson's, Alzheimer's, etc. In accordance with various embodiments, an exemplary tracking and telemetry system can provide a standalone wireless system that captures the animals' activities in their standard home cages for continuous monitoring (e.g., 24/7). Unlike alternative methods (i.e., RGB and IR depth cameras, capacitive sensors), this method can be fully automated and would not impose additional time and resource burden on the healthcare system. Such an exemplary system is a highly feasible approach to control large animal facilities for caring and monitoring purposes and can be implemented broadly for animal resources programs.

Next, referring FIG. 3B, a sensor array 110 with a single resonator 110*a* produces a single resonance frequency at $f_1$, $$f_1 = \frac{1}{2\pi\sqrt{L_{S1}C_{S1}}}. \tag{1}$$

However, since there are more than one resonator in the system of FIG. 3B, the resonance frequencies of the sensors are bifurcated at $f_1$-$f_6$ because of their mutual coupling and unbalanced capacitances. Therefore, we have 6 current loops, and the current in the $L_R$ reading coil, $I_R$, can be calculated using the following mesh current matrix.

$$\begin{bmatrix} L_R S & M_{R,S1}S & M_{R,S2}S & M_{R,S3}S & M_{R,S4}S & M_{R,S5}S & M_{R,S6}S \\ M_{R,S1}S & a_{51} & M_{S1,S2}S & M_{S1,S3}S & M_{S1,S4}S & 0 & 0 \\ M_{R,S2}S & M_{S1,S2}S & a_{52} & M_{S2,S3}S & M_{S2,S4}S & 0 & 0 \\ M_{R,S3}S & M_{S1,S3}S & M_{S2,S3}S & a_{53} & M_{S3,S4}S & M_{S3,S5}S & M_{S3,S6}S \\ M_{R,S4}S & M_{S1,S4}S & M_{S2,S4}S & M_{S3,S4}S & a_{54} & M_{S4,S5}S & M_{S4,S6}S \\ M_{R,S5}S & 0 & 0 & M_{S3,S5}S & M_{S4,S5}S & a_{55} & M_{S5,S6}S \\ M_{R,S6}S & 0 & 0 & M_{S3,S6}S & M_{S4,S6}S & M_{S5,S6}S & a_{56} \end{bmatrix} * \begin{bmatrix} I_R \\ I_{S1} \\ I_{S2} \\ I_{S3} \\ I_{S4} \\ I_{S5} \\ I_{S6} \end{bmatrix} = \begin{bmatrix} V_S \\ 0 \\ 0 \\ 0 \\ 0 \\ 0 \\ 0 \end{bmatrix} \tag{2}$$

where $S = j\omega$, $a_{Si} = L_S S + \frac{1}{C_{Si}S}$ ($i = 1, 2, \ldots, 6$), and $L_S = L_{S1\ldots} = L_{S6}$.

For the sake of simplicity and regarding the geometrical symmetry, we consider, $M_{RS}=M_{R,S1} \ldots =M_{R,S6}$, $M_A=M_{S1,S2}=M_{S1,S3}=M_{S2,S4}=M_{S3,S4}=M_{S3,S5}=M_{S4,S6}=M_{S5,S6}$, and $M_C=M_{S1,S4}=M_{S2,S3}=M_{S3,S6}=M_{S4,S5}$.

From the first row of matrix (2), $$L_R S I_R + M_{RS} S \Sigma_{i=1}^{6} I_{Si} = VS \tag{3}$$

Figure 4A:
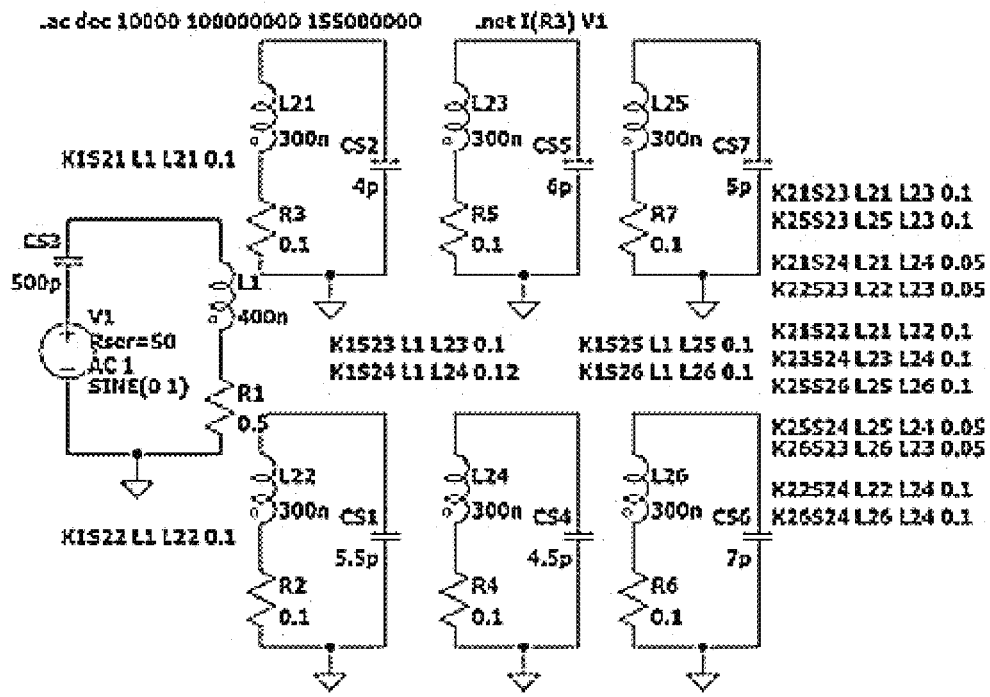
FIG. 4A shows an equivalent circuit model of FIG. 3A using LTspice.
Figure 4B:
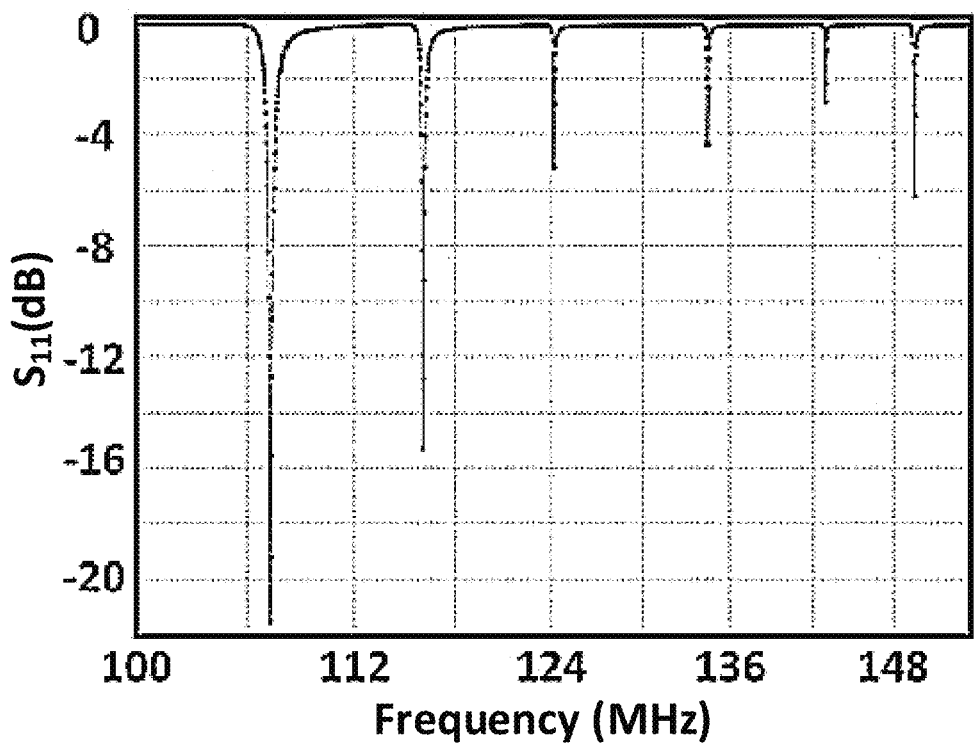
FIG. 4B shows simulation results performed on the equivalent circuit model of FIG. 4A.

The other 6 equations of rows 2-7 in matrix (2) can be found too. Solving the matrix (2) parametrically will generate 6 resonance frequencies that appear at the reading coil $L_R$. The resonance frequencies depend on the inductance of $L_{S1}$-$L_{S6}$, mutual couplings, and the resonance capacitances. Through the mutual couplings between the resonators, all the resonance frequencies influence each other. The resonance frequencies $f_1$-$f_6$ can be written in a general form of:

$$f_i = \frac{1}{2\pi\sqrt{(L_i \pm f_i(M)) * C_i}}, \quad i = 1, 2, \ldots 6 \tag{4}$$

where Li, Ci, and fi(M) can be calculated based on Equation (3) and the other equations that can be derived from matrix (2). The equivalent circuit model of the disclosed design has been simulated using LTspice, as shown in FIG. 4A, where the simulation results shown in FIG. 4B indicate the generated six resonance frequencies by the sensor array 110.

For evaluation purposes, a model of an exemplary tracking and telemetry system has been simulated using a high frequency simulation software (HFSS), where the HFSS is also used to characterize the performance of the resonators for tracking a body mass. The HFSS model and simulation results are utilized to find an optimal working frequency of the exemplary design, for which the shifts and levels of the resonance frequencies are sensitive to the body mass of a small laboratory animal located near the resonators. As such, the results support using the frequency range above 100 MHz based on the dielectric properties of the body tissues of a small animal in regard to the frequency.

Figure 5:
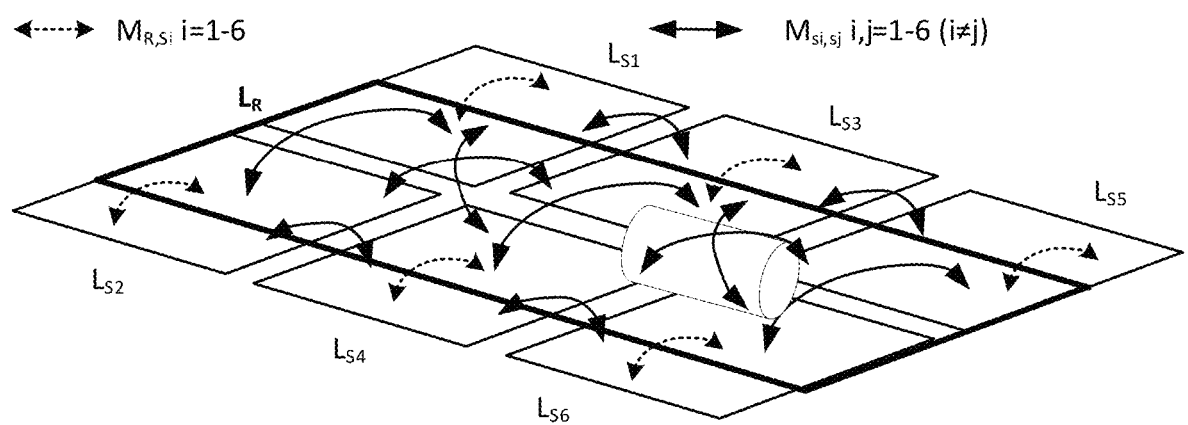
FIG. 5 shows a high frequency simulation software (HFSS) model for a sensor array and reading coil assembly and target object (as represented by a cylindrical shape) with the arrows indicating the mutual coupling between coil elements.

FIG. 5 shows a developed HFSS model for sensor array 110 and reading coil $L_R$ assembly and target object (as represented by a cylindrical shape) with the arrows indicating the mutual coupling between coil elements. The HFSS model includes the reading coil $L_R$ and six sensing resonators, $L_{S1}$-$L_{S6}$. The number and size of the resonators in the array is optimized based on the (1) average size of the target object, (2) coverage height, (3) coverage area, and (4) required resolution for detecting the location of the target object, such as a small animal. In an exemplary implementation, the minimum number of resonator elements in the array is four, which can be configured in a square form of a 2 by 2 array. In this design, the location of a body mass can be identified anywhere between two resonators using predictive capabilities of the transfer learning processes of the present disclosure.

Figure 6:
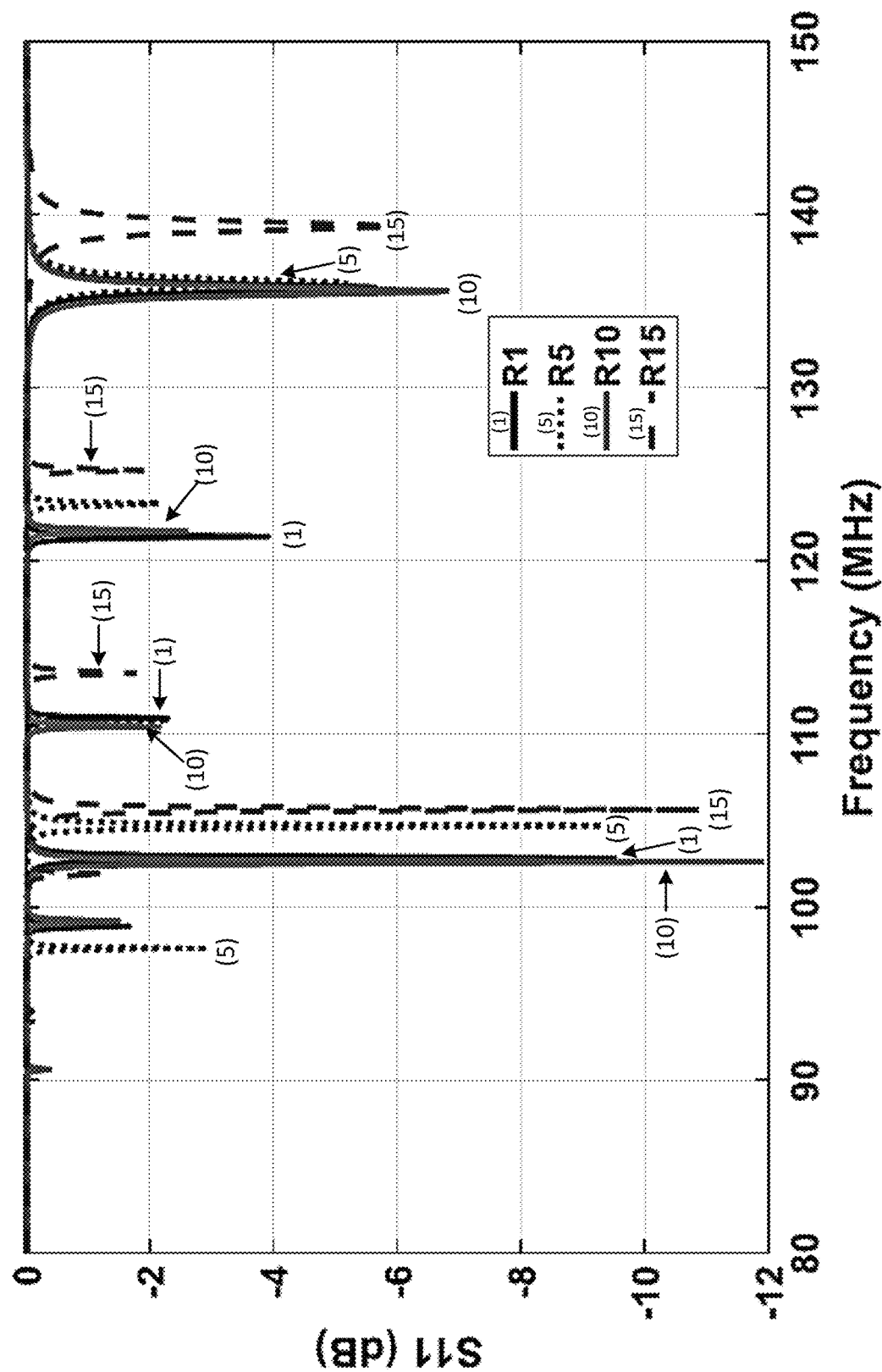
FIG. 6 shows the HFSS simulation results of the HFSS model of FIG. 5 by plotting the reading coil's reflection coefficient, S11, as a function of frequency.

Next, FIG. 6 shows the HFSS simulation results of the HFSS model by plotting the $L_R$'s reflection coefficient, S11, as a function of frequency. In this simulation, the size of the animal object is tested to determine whether the design is sensitive enough to detect body size variations ($R_1$-$R_{15}$). Correspondingly, the results confirm that both shifts in the frequency and changes in the deepness level of the resonance frequencies are significant and detectable.

Figure 7:
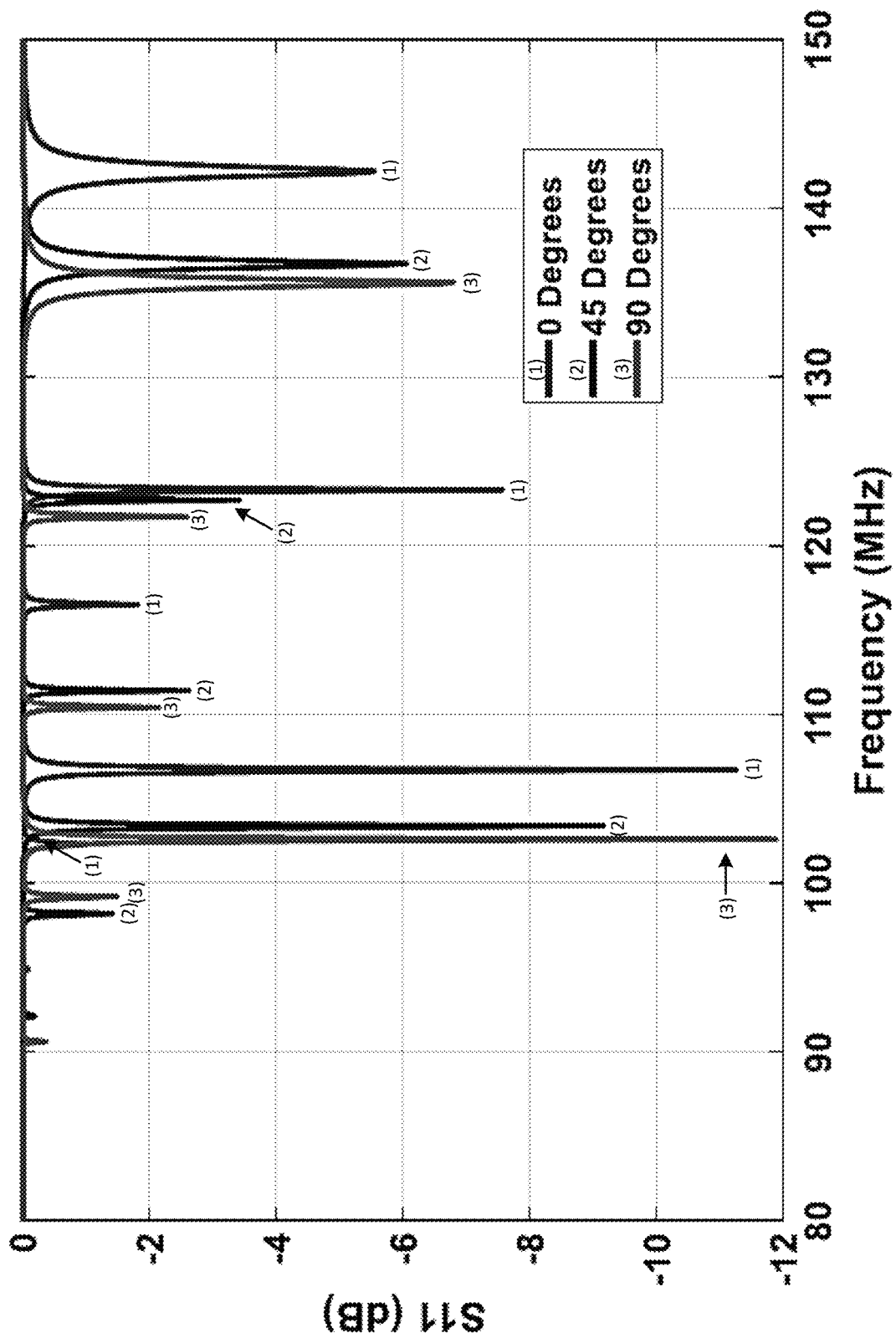
FIG. 7 shows the HFSS simulation results of the HFSS model of FIG. 5 by plotting the reading coil's reflection coefficient, S11, as a function of frequency for different angles of the cylindrical model of the target object.

In FIG. 7, HFSS simulation results show the S11 of the reading coil $L_R$ as a function of frequency for different angles of the cylindrical model of the target object (e.g., small animal). This simulation shows the sensitivity of the resonance frequency regarding any changes in the shape of the animal body. Therefore, such capability enables the detection of different behavior of small animal like standing, walking, sleeping, etc.

Figure 8:
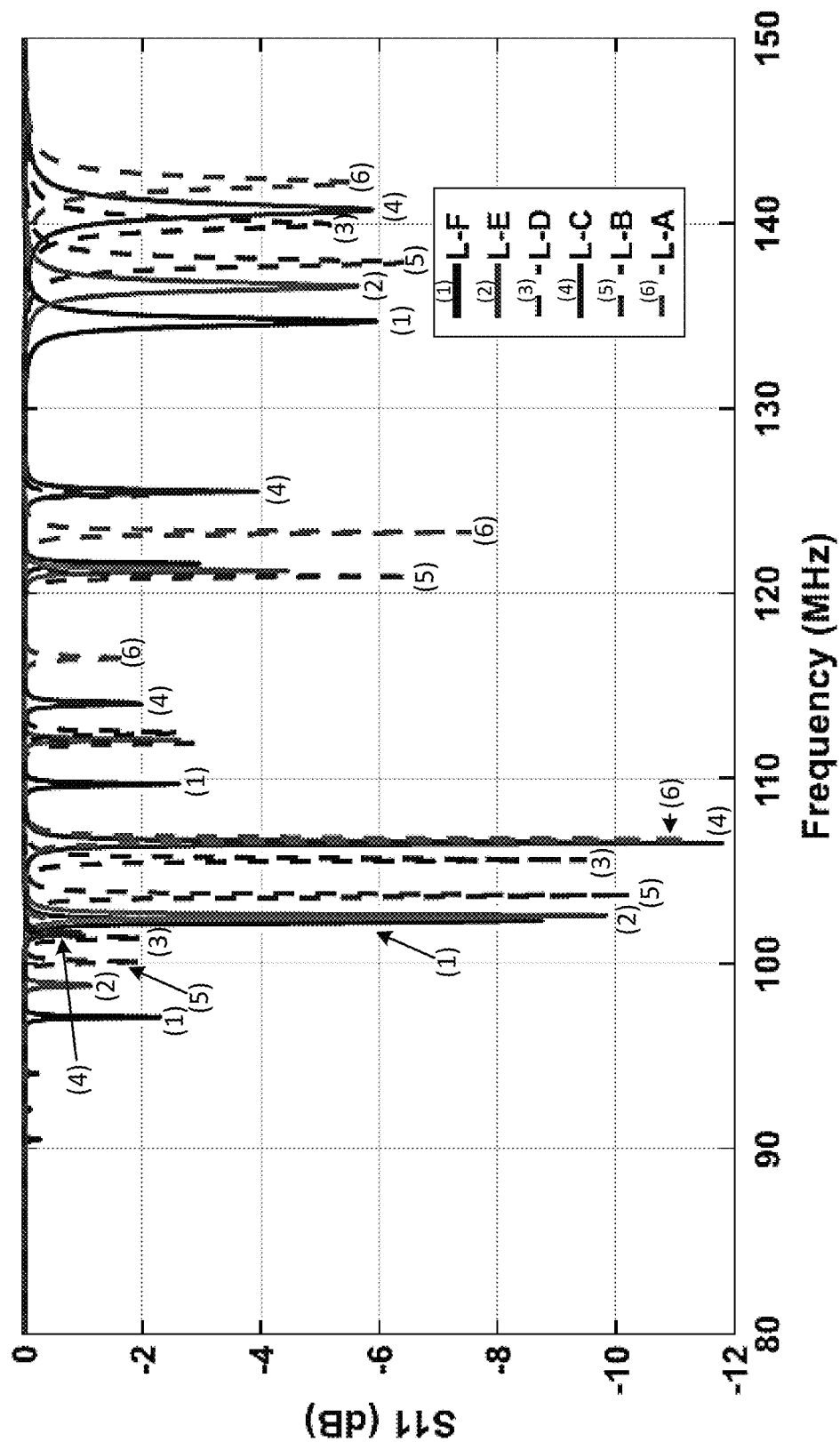
FIG. 8 shows the reflection coefficient S11 of the reading coil $L_R$ of the HFSS model of FIG. 5 as a function of frequency in a 2D plot while the location of the target object is swept over the resonator array.
Figure 9:
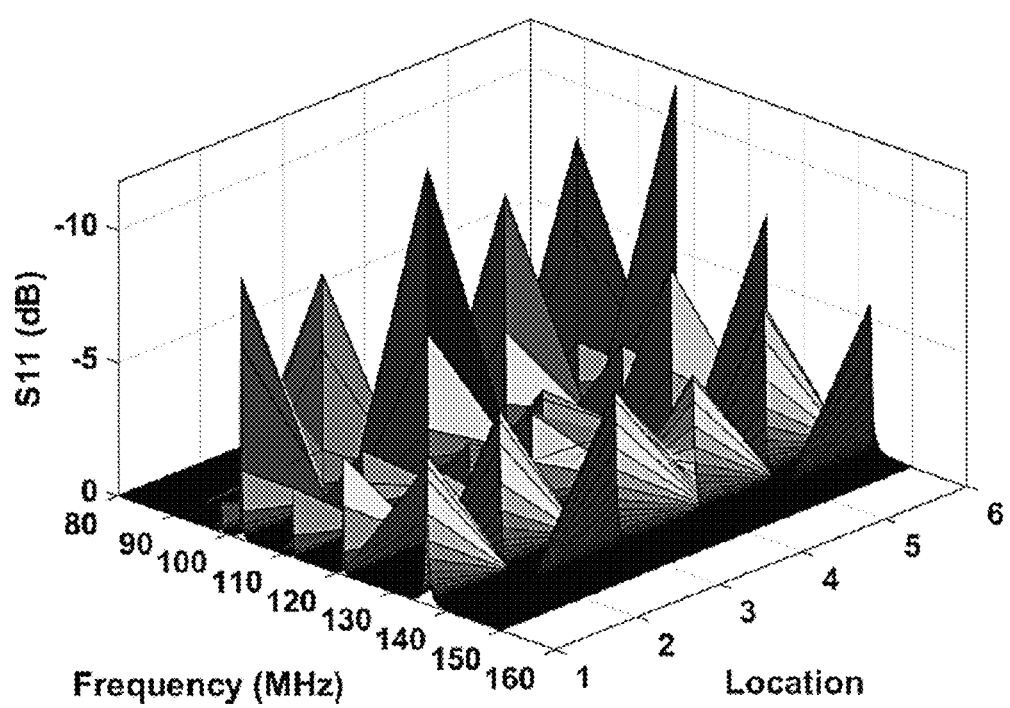
FIG. 9 shows simulation results of the reflection coefficient S11 of the reading coil of the HFSS model of FIG. 5 as a function of the frequency and location of the target object in a 3D plot.

In FIG. 8, HFSS simulation results show the reflection coefficient S11 of the reading coil $L_R$ as a function of frequency in a 2D plot while the location of the animal body is swept over the resonator array (from location L-A to location L-F). Correspondingly, FIG. 9 illustrates the simulation results which show the reflection coefficient S11 of the reading coil $L_R$ as a function of the frequency and location of the body mass in a 3D plot. The significant changes in deepness level and shift of the resonance frequencies demonstrate the capability of detecting the location of a target object above the sensor array 110.

Figure 10A:
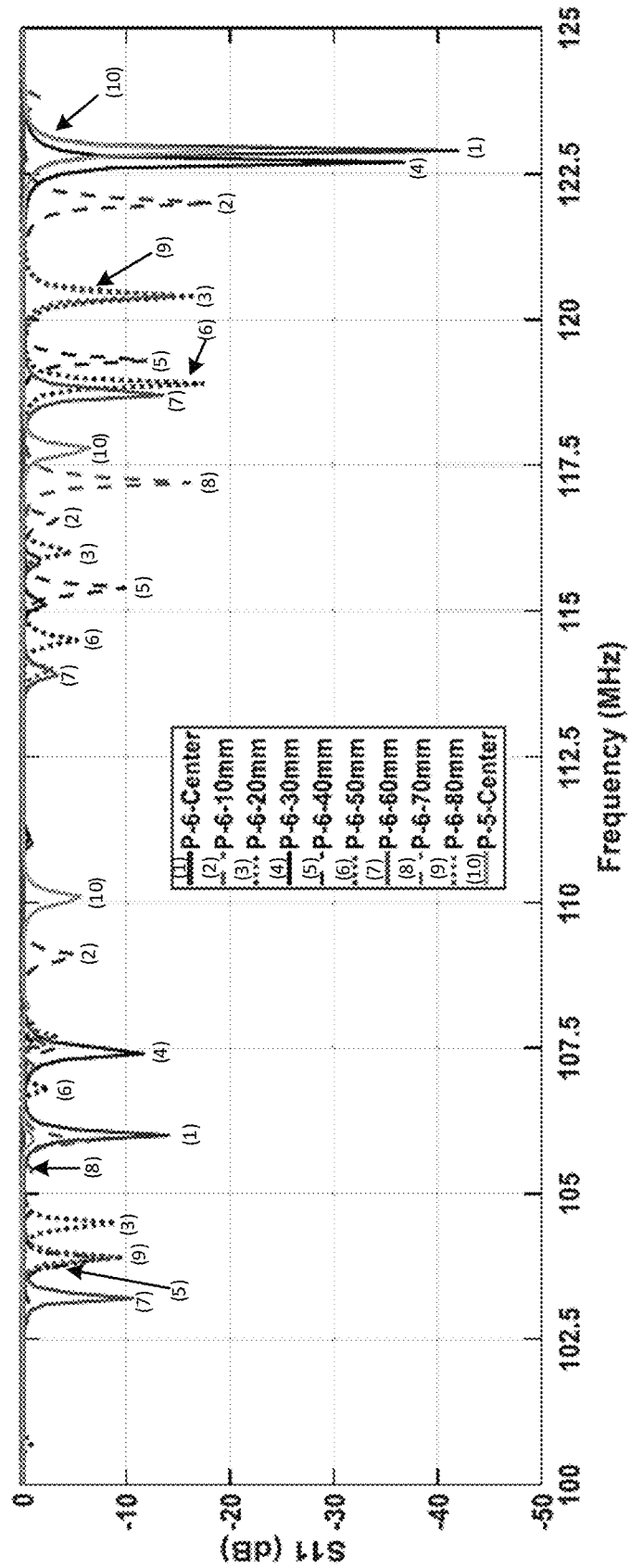
FIG. 10A shows simulation results of the reflection coefficient S11 of the reading coil $L_R$ as a function of frequency while the location of the target object over the sensor array is swept between two adjacent resonators.
Figure 10B:
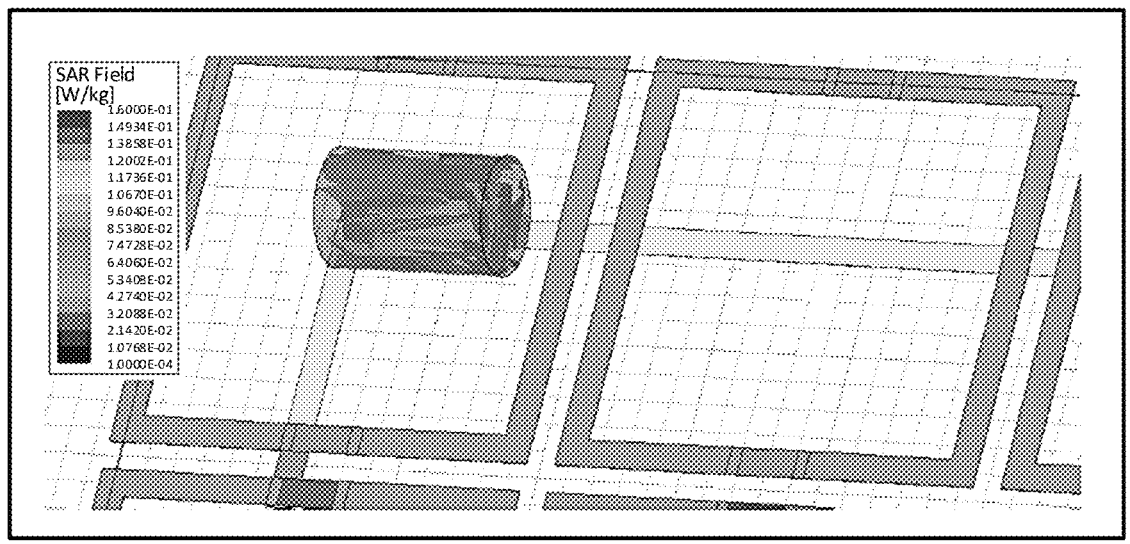
FIG. 10B shows the average Specific Absorption Rate (SAR) simulation results using the HFSS model of FIG. 5.

FIG. 10A presents simulation results showing the S11 of the reading coil $L_R$ as a function of frequency while the location of the animal body over the sensor array 110 is swept between two adjacent resonators, $L_{S5}$(P-5)-$L_{S6}$(P-6), with a 10 mm step size. These HFSS simulation results show the shifts and quality changes of the resonance frequencies in the return loss, S11, of the $L_R$ as a function of frequency. The obtained significant changes in the S11 curves (variations of the bifurcation levels, Δf) confirm the ability to precisely identify the location of the object body over the sensor array with less than 10 mm resolution. The HFSS model can also be used to evaluate the Specific Absorption Rate (SAR), which is a measure of the rate of absorption of RF energy in the animal body. Accordingly, FIG. 10B, presents the average SAR simulation results using the HFSS model), which is well below the standard limit of 1.6 W/kg.

Figure 11:
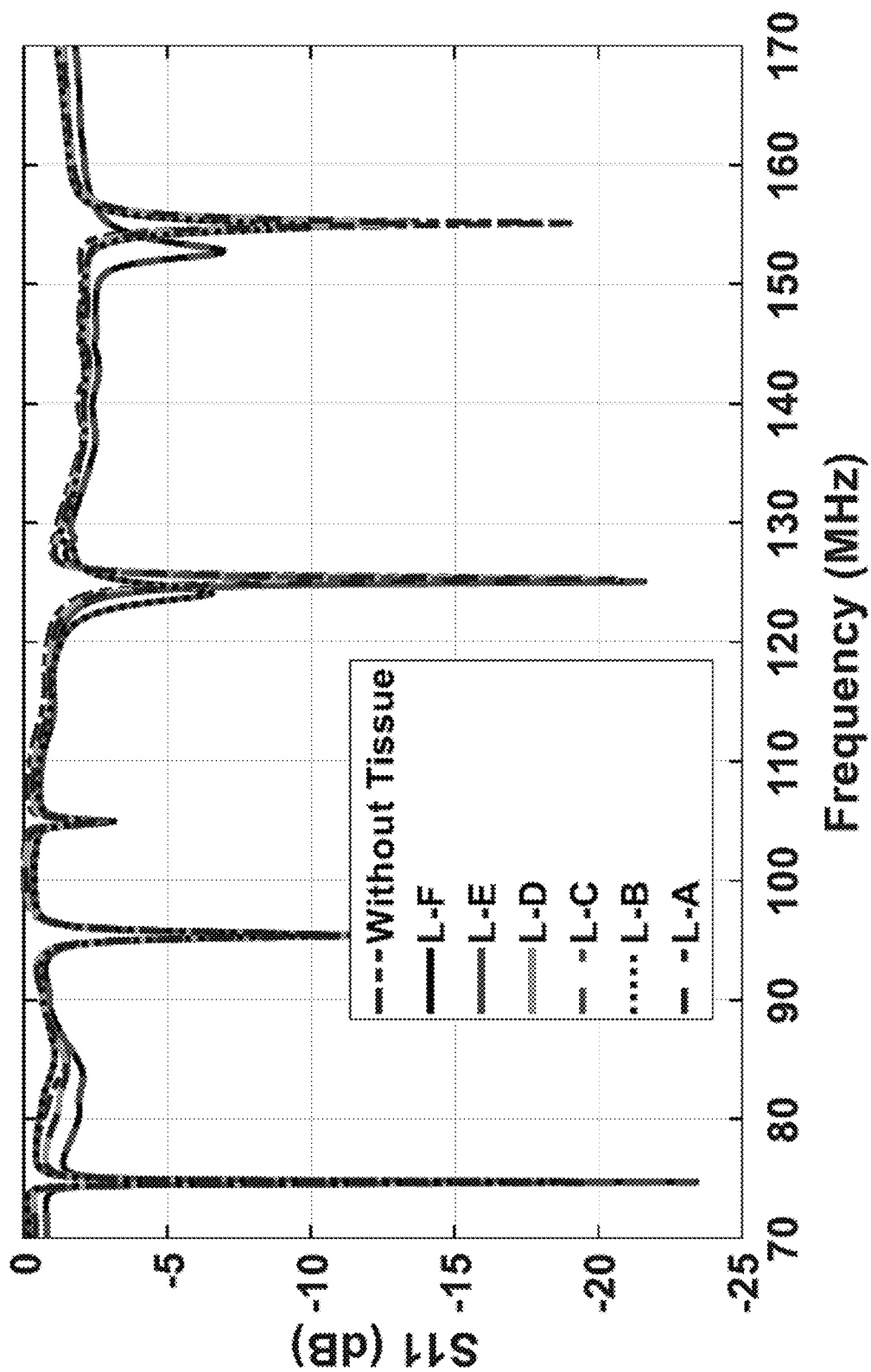
FIG. 11 shows simulation results of measured bifurcation level and shift of resonance frequencies as a function of the frequency and changing location of the target object using the HFSS model of FIG. 5.

The feasibility of the sensor array & reading coil assembly is verified by developing a prototype and testing the concept of the assembly. For this verification, an exemplary tracking and telemetry system is implemented by making a reading coil using 13 mm flat and flexible foil coil (one turn, 12×24 cm²) and 6 sensing resonator coils (13 mm flat and flexible foil coil, one turn, 8×8 cm²) with different values of constant capacitors covering the frequency range of 70-180 MHz. The test setup included the implemented reading coil and sensor array, computing device, and a vector network analyzer. This setup is prepared for measuring S11 and evaluating the level of the multiple resonance frequency bifurcations, shifts and deepness's, with changing the location of the body mass of a target object over the sensor array. Using the vector network analyzer, covering 1 MHz-3 GHz, the reflection coefficient (S11) is measured with visible bifurcation level on the resonance frequencies, as shown in FIG. 11. Here, the frequency range of 70 MHz to 180 MHz was selected for measurement. This frequency range covers the boundary that the sensor array starts being sensitive to a small animal body (~100 MHz). The measured S11 results, presented in FIG. 11, indicates the shifts in the resonance frequencies of resonators for the frequencies tuned to be higher than 100 MHz. In this measurement, the location of body mass (human hand for this case that is a model for a small animal body) is swept over the array. By changing the location of the body mass, the corresponding resonance frequencies are changed independently regarding the other resonance frequencies and no significant change are measured at the frequency lower than 100 MHz, which supports the use of frequencies higher than 100 MHz for being able to detect animal body and motion.

Figure 12:
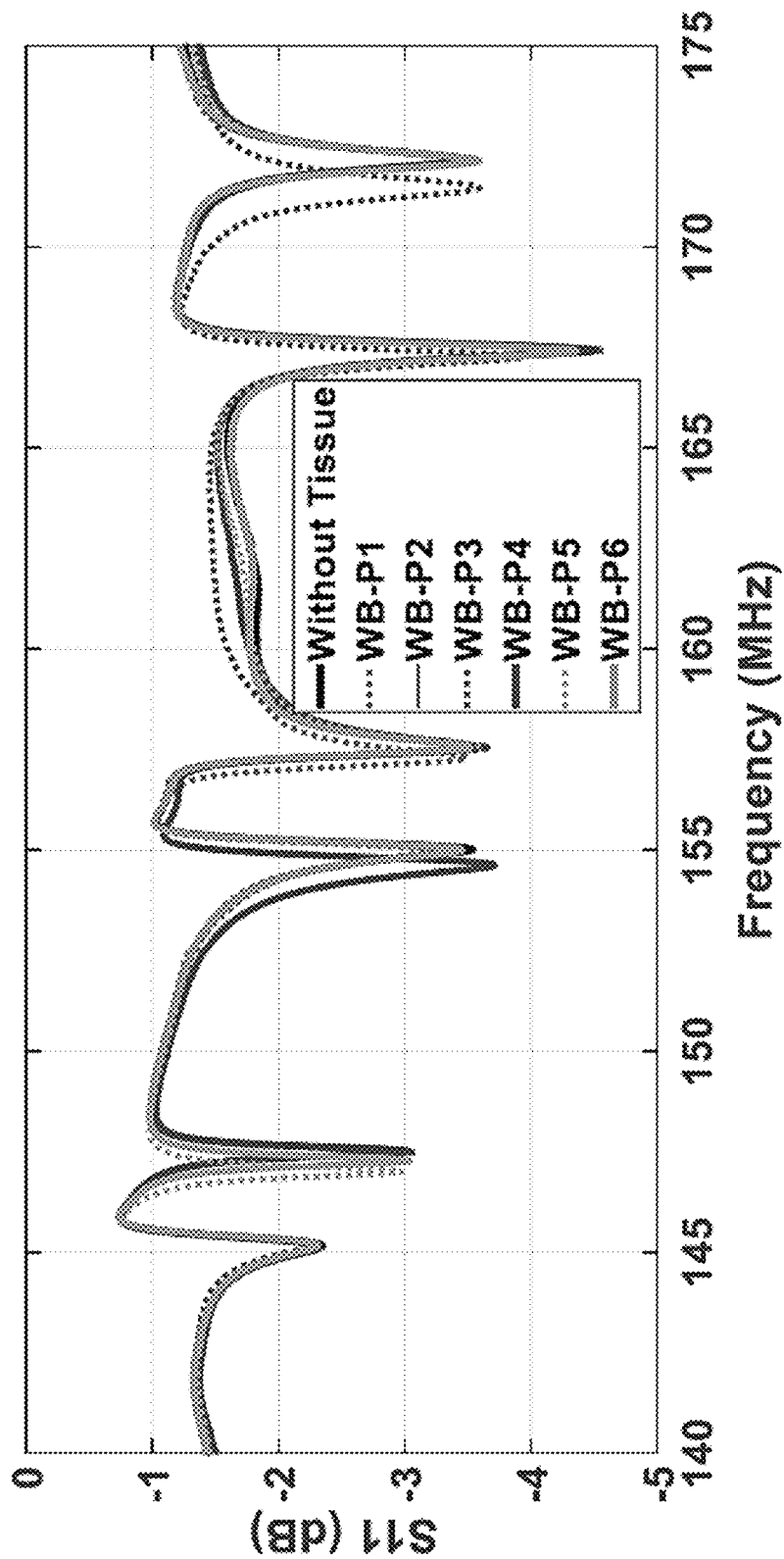
FIG. 12 shows simulation results of the reflection coefficient of the reading coil for a test setup of an exemplary tracking and telemetry system featuring a cage positioned over the sensor array and a target object being moved over the sensor array.

In a follow-up test, the test setup featured a standard mice cage (having dimensions 20×31×13 cm³) positioned over the sensor array 110 and reading coil $L_R$ assembly and used fresh meat (2.5×3.8×6.3 cm³) as representing the small animal body. Accordingly, measured results of the S11 as a function of frequency and location of the piece of fresh meat (as the fresh meat is swept over the sensor array) are provided in FIG. 12 and verify the shifts in the resonance frequencies with movement of the location of the body model inside the cage.

In brief, an exemplary tracking and telemetry system/method of the present disclosure utilizes an advanced electromagnet-based body imaging technique which provides the first multi-resonance frequencies bifurcation-based passive wireless sensing mechanism with the capability of detecting and tracking a target object and converting the coverage volume to digital data (acting as a 3-Dimensional Analog to Digital Converter (3D-ADC)). Thus, by analyzing electromagnetic properties of the target object (e.g., body tissue in order to detect a living animal, water properties in order to detect water leakage, etc.), the exemplary system/method can estimate the shape/posture of the small animal body and detect parameters like water leakage, which is usually invisible for cameras, as used in conventional techniques. Such a design reduces the overall implementation costs and enables the system/method to be practiced under various lighting conditions (bright and dark), which provides a means to have long-term camera-free activity monitoring and behavior detection/recognition capabilities. As a result, power consumption, data transmission, and data storage needs of the system are reduced as compared to conventional approaches.

An exemplary system can be mounted in a rack of an animal facility and can be used to monitor the behavior of multiple animals in one cage and multiple animals across multiple cages simultaneously. The monitored behavior can cover a wide range of applications including real-time processing of the measured sensor-data, 24/7 monitoring, social behavior monitoring and recognition, implantable/wearable devices for body motion tracking, metal, and water source detection, addiction study, unwanted/unexpected animal behavior, vital signs monitoring to study physiological disorders, such as epilepsy and seizure on a large scale.

As such, an exemplary transfer learning algorithm can be trained/adapted to detect seizures and any other abnormal physiological and behavioral activities, such as Parkinson's, Alzheimer's, etc. Additionally, an exemplary system/method can be adapted for different use cases, such as, but not limited to, different sizes, shapes, or types of cages and other enclosures and can be scaled up and adapted to control large animal facilities for caring and monitoring purposes.

Figure 13:
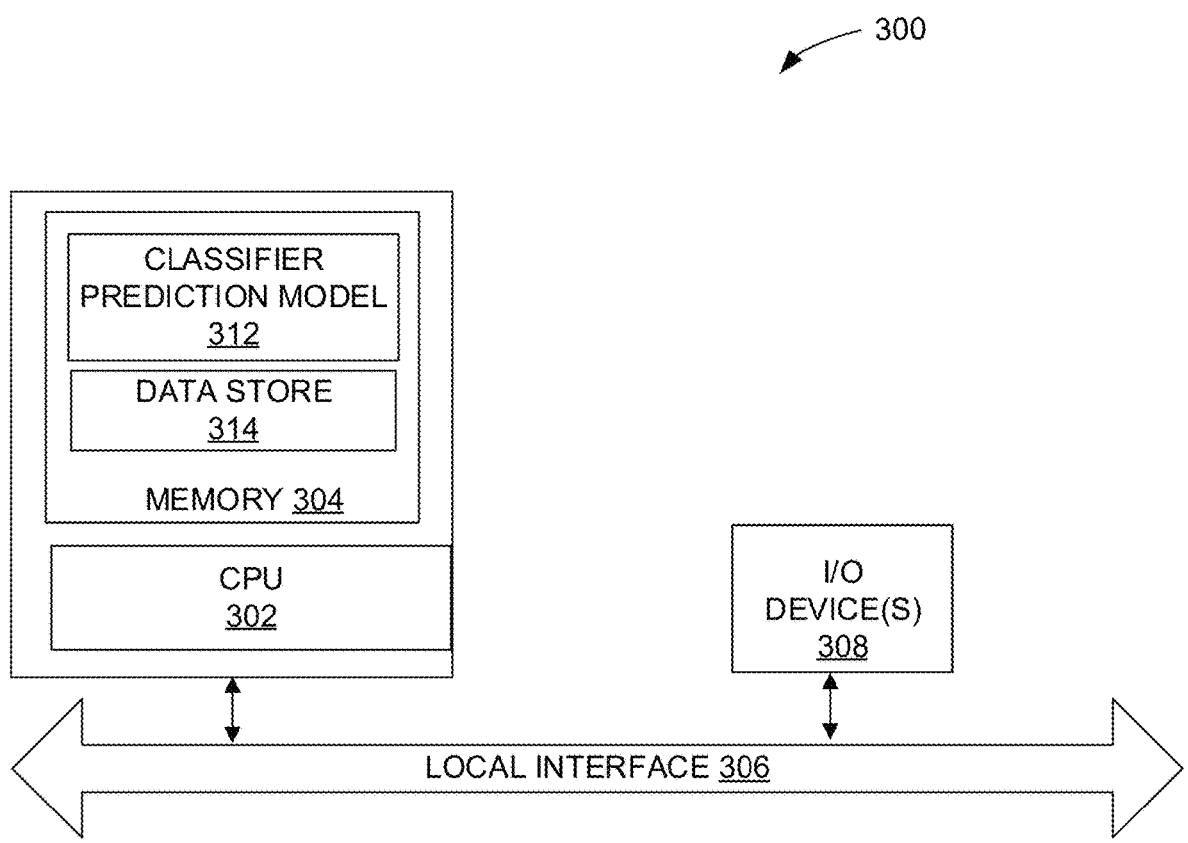
FIGS. 13-14 depict schematic block diagrams of a computing device that can be used to implement various embodiments of the present disclosure.

FIG. 13 depicts a schematic block diagram of a computing device 300 that can be used to implement various embodiments of the present disclosure, such as the control unit 120. An exemplary computing device 300 includes at least one processor circuit, for example, having a processor (CPU) 302 and a memory 304, both of which are coupled to a local interface 306, and one or more input and output (I/O) devices 308. The local interface 306 may comprise, for example, a data bus with an accompanying address/control bus or other bus structure as can be appreciated. The CPU can perform various operations including any of the various operations described herein.

Stored in the memory 304 are both data and several components that are executable by the processor 302. In particular, stored in the memory 304 and executable by the processor 302 is a classifier prediction model 312 in accordance with embodiments of the present disclosure. Also stored in the memory 304 may be a data store 314 and other data. The data store 314 can include frequency spectrum data, prediction data, and potentially other data. In addition, an operating system may be stored in the memory 304 and executable by the processor 302. The I/O devices 308 may include input devices, for example but not limited to, a keyboard, touchscreen, mouse, recording devices, communication transceiver(s), sensor array & reading coil assemblies, etc. Furthermore, the I/O devices 308 may also include output devices, for example but not limited to, a display, speaker, earbuds, audio output port, a printer, communication transceiver(s), etc.

Figure 14:
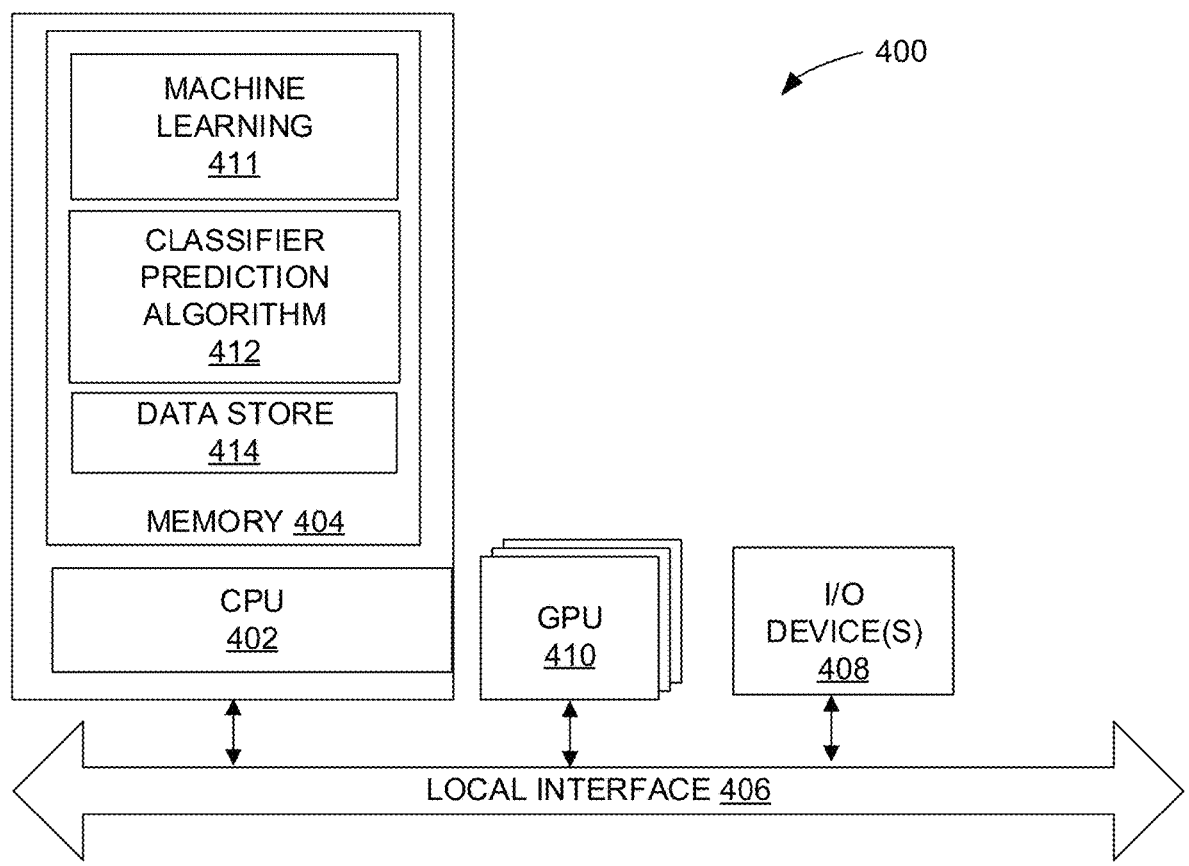

FIG. 14 depicts a schematic block diagram of a computing device 400 that can be used to implement various embodiments of the present disclosure, such as during the training phase for building the classifier prediction model 312. An exemplary computing device 400 includes at least one processor circuit, for example, having a processor (CPU) 402 and a memory 404, both of which are coupled to a local interface 406, and one or more input and output (I/O) devices 408. The local interface 406 may comprise, for example, a data bus with an accompanying address/control bus or other bus structure as can be appreciated. The computing device 400 further includes Graphical Processing Unit(s) (GPU) 410 that are coupled to the local interface 406 and may utilize memory 404 and/or may have its own dedicated memory. The CPU and/or GPU(s) can perform various operations such as image enhancement, graphics rendering, image/video processing, recognition (e.g., text recognition, object recognition, feature recognition, etc.), image stabilization, machine learning, filtering, image classification, and any of the various operations described herein.

Stored in the memory 404 are both data and several components that are executable by the processor 402. In particular, stored in the memory 404 and executable by the processor 402 are code for implementing machine learning techniques 411 (e.g., transfer learning) and a classifier prediction algorithm 412 for using the machine learning to build a classifier prediction model 312. Also stored in the memory 404 may be a data store 414 and other data. The data store 414 can include frequency spectrum data, video/imaging data, and potentially other data. In addition, an operating system may be stored in the memory 404 and executable by the processor 402. The I/O devices 408 may include input devices, for example but not limited to, a keyboard, touchscreen, mouse, recording devices, communication transceiver(s), sensor array & reading coil assembl(ies), camera(s), etc. Furthermore, the I/O devices 408 may also include output devices, for example but not limited to, a display, speaker, earbuds, audio output port, a printer, communication transceiver(s), etc.

Certain embodiments of the present disclosure can be implemented in hardware, software, firmware, or a combination thereof. If implemented in software, classifier prediction algorithm and/or classifier prediction model logic or functionality, in accordance with embodiments of the present disclosure, are implemented in software or firmware that is stored in a memory and that is executed by a suitable instruction execution system. If implemented in hardware, the classifier prediction algorithm and/or classifier prediction model logic or functionality can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments are merely possible examples of implementations, merely set forth for a clear understanding of the principles of the present disclosure. Many variations and modifications may be made to the above-described embodiment(s) without departing substantially from the principles of the present disclosure. All such modifications and variations are intended to be included herein within the scope of this disclosure.

Therefore, at least the following is claimed:

1. A system comprising:
a sensor array positioned underneath a coverage area, wherein the sensor array comprises a plurality of sensing resonators tuned at different resonance frequencies, where an output frequency response of the sensor array varies as a function of a location of a target object or a shape of the target object within the coverage area;
a signal generator configured to generate a continuous wave signal over a frequency range;
a reading coil element electromagnetically coupled to the sensor array, wherein the reading coil element comprises a conductive loop and is configured to receive the continuous wave signal from the signal generator and to acquire reflection coefficient data of the reading coil element showing changes in the output frequency response of the sensor array;
a control unit communicatively coupled to the reading coil element, wherein the control unit is configured to receive the frequency spectrum data from the reflection coefficient data of the reading coil element and is further configured to predict a location of the target object within the coverage area or a behavior of the target object based on the received frequency spectrum data using a classifier predictive model; and
a computing device that is trained using machine learning to implement a classifier prediction algorithm that generates the classifier prediction model, wherein the machine learning comprises a transfer learning technique with dual data inputs in a training phase and only frequency spectrum data in a prediction phase, wherein the dual data inputs comprise the frequency spectrum data and video data.

2. The system of claim 1, wherein the target object comprises a living animal.

3. The system of claim 1, wherein the target object comprises water or a metal object.

4. The system of claim 1, further comprising a cage enclosure, wherein a bottom surface of the cage enclosure comprises the coverage area.

5. The system of claim 1, wherein the frequency range is above 100 MHz.

6. The system of claim 1, wherein the different resonance frequencies are greater than 100 MHZ.

7. The system of claim 1, wherein the control unit continually transmits the predicted location or behavior of the target object to a base station monitoring unit.

8. The system of claim 1, wherein the plurality of sensing resonators include at least 4 sensing resonators.

9. A method comprising:
positioning a sensor array under a coverage area, wherein the sensor array comprises a plurality of sensing resonators tuned at different resonance frequencies, where an output frequency response of the sensor array varies as a function of a location of a target object or a shape of the target object within the coverage area;
generating a continuous wave signal over a frequency range;
electromagnetically coupling a reading coil element to the sensor array, wherein the reading coil element comprises a conductive loop;
applying the continuous wave signal to the reading coil element;
acquiring reflection coefficient data of the reading coil element showing changes in the output frequency response of the sensor array from the reading coil element; and
predicting, by a control unit device using machine learning, a location of the target object within the coverage area or a behavior of the target object based on the frequency spectrum data acquired from the reflection coefficient data of the reading coil element,
wherein the machine learning comprises a transfer learning technique with dual data inputs in a training phase and only frequency spectrum data in a prediction phase, wherein the dual data inputs comprise the frequency spectrum data and video data.

10. The method of claim 9, wherein the target object comprises a living animal.

11. The method of claim 10, further comprising a cage enclosure, wherein a bottom surface of the cage enclosure comprises the coverage area.

12. The method of claim 11, wherein the cage enclosure holds a plurality of living animals, wherein the method predicts locations or behaviors of the plurality of living animals within the cage enclosure.

13. The method of claim 9, wherein the target object comprises water or a metal object.

14. The method of claim 9, wherein the frequency range is above 100 MHz.

15. The method of claim 9, wherein the different resonance frequencies are greater than 100 MHZ.

16. The method of claim 9, further comprising transmitting the predicted location or behavior of the target object to a base station monitoring unit.

17. The method of claim 9, wherein the plurality of sensing resonators include at least 4 sensing resonators.

18. A non-transitory computer readable storage medium having instructions stored therein, wherein the instructions, when executed by a processor, cause the processor to:
generate a continuous wave signal over a frequency range;
apply the continuous wave signal to a reading coil element that is electromagnetically coupled to a sensor array, wherein the sensor array comprises a plurality of sensing resonators tuned at different resonance frequencies, where an output frequency response of the sensor array varies as a function of a location of a target object or a shape of the target object within a coverage area of the sensor array;
acquire reflection coefficient data of the reading coil element showing changes in the output frequency response of the sensor array from the reading coil element; and
predict, by a control unit device using machine learning, a location of the target object within the coverage area or a behavior of the target object based on frequency spectrum data acquired from the reflection coefficient data of the reading coil element,
wherein the machine learning comprises a transfer learning technique with dual data inputs in a training phase and only frequency spectrum data in a prediction phase, wherein the dual data inputs comprise the frequency spectrum data and video data.

* * * * *